(12) United States Patent
Park

(10) Patent No.: US 9,585,115 B2
(45) Date of Patent: Feb. 28, 2017

(54) RF CARRIER SYNCHRONIZATION AND PHASE ALIGNMENT METHODS AND SYSTEMS

(71) Applicant: PhasorLab, Inc., Billerica, MA (US)

(72) Inventor: Joshua C. Park, Billerica, MA (US)

(73) Assignee: PhasorLab, Inc., Billerica, MA (US)

( * ) Notice: Subject to any disclaimer, the term of this patent is extended or adjusted under 35 U.S.C. 154(b) by 0 days.

(21) Appl. No.: 15/090,338

(22) Filed: Apr. 4, 2016

(65) Prior Publication Data

US 2016/0219544 A1 Jul. 28, 2016

Related U.S. Application Data

(60) Division of application No. 14/727,859, filed on Jun. 1, 2015, which is a continuation of application No.
(Continued)

(51) Int. Cl.
| | | |
|---|---|---|
| *H04L 7/00* | (2006.01) | |
| *H04W 56/00* | (2009.01) | |
| *H04L 27/00* | (2006.01) | |
| *H04B 7/04* | (2006.01) | |
| *H04L 25/02* | (2006.01) | |

(Continued)

(52) U.S. Cl.
CPC ............ *H04W 56/006* (2013.01); *G01S 3/18* (2013.01); *H04B 7/0413* (2013.01);
(Continued)

(58) Field of Classification Search
CPC .................................................. H04W 56/006
(Continued)

(56) References Cited

U.S. PATENT DOCUMENTS 6,661,852 B1 12/2003 Genrich
8,467,365 B1 * 6/2013 Rai .................. H04W 56/0015
370/324
(Continued)

FOREIGN PATENT DOCUMENTS

JP 62-025543 2/1987
JP 62-211850 9/1988
(Continued)

OTHER PUBLICATIONS

International Search Report for PCT/US2013/062935 mailed Feb. 14, 2014. Previously submitted in U.S. Appl. No. 14/043,789 according to 37 C.F.R. 1.98(d).
(Continued)

*Primary Examiner* — Qutbuddin Ghulamali
(74) *Attorney, Agent, or Firm* — Michael Y. Saji

(57) ABSTRACT

Systems and methods are disclosed for synchronization and positioning, one of which comprises determining a first phase offset for a known signal received at a first antenna by plotting a first arbitrary set of phase corrections and finding a phase offset corresponding to a greatest reflectional symmetry within the first arbitrary set of phase corrections, determining a second phase offset for a known signal received at a second antenna by plotting a second arbitrary set of phase corrections and finding a phase offset corresponding to a greatest reflectional symmetry within the second arbitrary set of phase corrections, calculating an angle of arrival for the known signal from the transmitter based on the first and the second phase offset for the known signal as received at the first antenna and the second antenna, and calculating a positioning vector for a direction of the transmitter.

16 Claims, 8 Drawing Sheets

Related U.S. Application Data

14/043,789, filed on Oct. 1, 2013, now Pat. No. 9,048,979.

(60) Provisional application No. 61/708,116, filed on Oct. 1, 2012.

(51) Int. Cl.
*H04L 27/36* (2006.01)
*G01S 3/18* (2006.01)
*H04W 64/00* (2009.01)

(52) U.S. Cl.
CPC ............ *H04L 7/0016* (2013.01); *H04L 25/02* (2013.01); *H04L 27/0014* (2013.01); *H04L 27/364* (2013.01); *H04W 56/0035* (2013.01); *H04W 64/006* (2013.01); *H04L 2027/003* (2013.01); *H04L 2027/0046* (2013.01); *H04L 2027/0053* (2013.01); *H04L 2027/0067* (2013.01)

(58) Field of Classification Search
USPC ................................ 375/354–357; 455/456.1
See application file for complete search history.

(56) References Cited

U.S. PATENT DOCUMENTS

| | | | |
|---|---|---|---|
| 2001/0031639 A1* | 10/2001 | Makipaa | H04J 13/16 455/450 |
| 2002/0159534 A1 | 10/2002 | Duncan et al. | |
| 2004/0146122 A1 | 7/2004 | Fague et al. | |
| 2007/0036247 A1 | 2/2007 | Capretta et al. | |
| 2010/0128824 A1 | 5/2010 | Hui | |
| 2010/0322288 A1 | 12/2010 | Kawano | |
| 2014/0301494 A1* | 10/2014 | Hsu | H04B 7/026 375/267 |
| 2014/0348155 A1* | 11/2014 | Chintalapudi | H04B 1/00 370/350 |
| 2016/0011296 A1* | 1/2016 | Keegan | H04L 27/2601 370/252 |

FOREIGN PATENT DOCUMENTS

| | | |
|---|---|---|
| JP | 02-084847 | 3/1990 |
| JP | 10-075275 | 3/1998 |
| WO | PCT/US2000/020060 A1 | 2/2001 |
| WO | PCT/US2013/062935 A1 | 4/2014 |

OTHER PUBLICATIONS

Written Opinion for PCT/US2013/062935 mailed Feb. 14, 2014. Previously submitted in U.S. Appl. No. 14/043,789 according to 37 C.F.R. 1.98(d).

Japanese Office Action for Application No. 2015-534821, Japan Patent Office, Received Nov. 17, 2015 (Original and Google Translation Attached).

Partial European Search Report for PCT/US2013062935, received Apr. 19, 2016.

\* cited by examiner

RF CARRIER SYNCHRONIZATION AND PHASE ALIGNMENT METHODS AND SYSTEMS

CROSS-REFERENCE TO RELATED APPLICATIONS

The present application is a divisional application of, and claims the benefit under 35 U.S.C. §120 of, U.S. patent application Ser. No. 14/727,859, which itself is a continuation of and claims priority to U.S. patent application Ser. No. 14/043,789, each of which having the same title as the present application, the contents of each of which are hereby incorporated herein by reference in their entireties. This application contains at least a claim to a claimed invention that has an effective filing date as defined in 35 U.S.C. 100(i) that is on or after Mar. 16, 2013.

BACKGROUND OF THE INVENTION

Conventional synchronization techniques used between base stations rely on GPS signals, which broadcast precision time stamps as well as a 1 Hz reference signal. Base stations can extract this timing information through a demodulation process and use them to acquire accurate time as well as the frequency reference needed for training local oscillators, such as VCXOs or OCXOs, whose accuracy, although quite accurate, by itself is not accurate enough for use in base stations. With the expected proliferation of smaller-sized base stations—henceforth we refer them collectively as 'microcell' base stations—GPS-based solutions could be either (1) too expensive an option if the microcell base station were to contain a separate GPS receiver, or (2) unavailable due to the environment in which the microcell base station is located. The only other alternative carrier synchronization methodology accurate enough to meet the needs of 4G and beyond is Precision Time Protocol (PTP) defined in the IEEE 1588 standard. PTP based on IEEE 1588 relies on availability of Ethernet through a wireline access, which may not always be available for a given microcell environment. For instance, a standalone microcell that also provides a back-haul communication link to the macro base stations could be located somewhere without a wired Ethernet access and in need of a synchronization method.

Accordingly, there is a need for improved RF synchronization and phase alignment systems and methods.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 2:
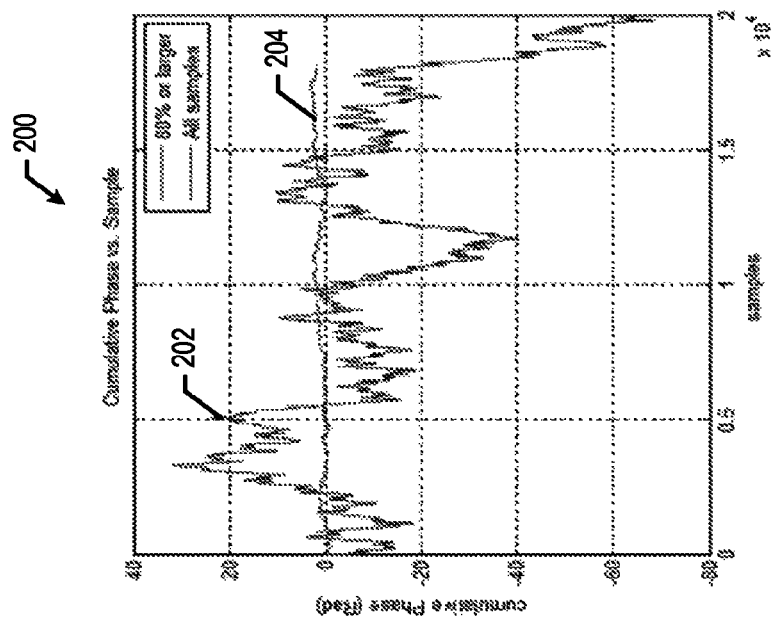
FIG. 2 is a flowchart of a plot of cumulative phase values in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one embodiment, a method comprises: generating a baseband information signal by mixing a received modulated carrier signal with a local oscillator (LO) signal having an LO frequency; obtaining baseband signal samples of the baseband information signal having a baseband signal magnitude and a baseband signal phase; determining a cumulative phase measurement associated with baseband signal samples having a baseband signal magnitude greater than a threshold; and, applying a correction signal to compensate for an LO frequency offset of the LO frequency based on the cumulative phase.

In a further embodiment, a method comprises: generating a baseband information signal by mixing a received modulated carrier signal with a local oscillator (LO) signal having an LO frequency; obtaining baseband signal samples of the baseband information signal having an in-phase signal sample and a quadrature signal sample; determining an offset frequency rotation based on an estimated correlation between the in-phase signal samples and the quadrature signal samples; and, processing the baseband information signal using the offset frequency rotation.

Described herein are the above embodiments as well as additional embodiments, some of which are particularly useful to perform radio frequency (RF) carrier synchronization for use in wireless communications. Advanced wireless communication networks such as 4G LTE, and LTE-advanced, require a minimum accuracy of 0.05 parts per million (50 ppb) for the carrier frequency. Conventional approaches to this requirement have been to incorporate GPS receivers in the system in order to synchronize time and frequency between base stations. However, with increasing needs for micro-cell, and pico-cell base stations, relying on GPS-based solution becomes either too expensive or unavailable as an option. Presented in this document are two alternative ways to achieving accurate RF carrier synchronization as well as phase alignment at the physical-layer level. The synchronization methods described here can be implemented in any modulated communication system independent of the modulation method. The technology described here can meet the 2nd source needs for the carrier synchronization critical for the economical high-volume deployment of small-cell base stations.

The methods described herein achieve carrier synchronization between nodes of a communication network without any extra source outside of the communication network, such as the GPS signal or Ethernet connectivity. Instead, it utilizes the characteristics of the received RF signal and accomplishes highly accurate synchronization, which in some embodiments may be used to train the crystal oscillators (XOs) in the receiver end and maintaining accurate timing information. This new method allows the microcell to become the primary source for clock and timing reference for the subsequent wired or wireless networks that it connects to.

Embodiments of the carrier synchronization methods presented here include at least (i) coarse and wide-range synchronization methods and (ii) precise narrow-range synchronization methods. The coarse and wide-range synchronization methods achieves the accuracy of about 0.1 parts per million (or 100 ppb) without any fundamental range limit. The precise narrow-range synchronization technique achieves frequency lock better than 1 part per billion (<1 ppb) and at the same time accomplishes phase alignment for the demodulated baseband signal.

Embodiments of the wide range synchronization techniques make use of the random nature of the quadrature modulated signal. Quadrature modulated signals in general have random instantaneous amplitude and phase. However, if we try to use the random nature of its instantaneous phase of a modulated signal in BB as a reference for synchronization, we find that its cumulative long-run average does not necessarily converge to a cumulative zero-rotation. Furthermore, the busier the baseband constellation is, the more random its cumulative phase rotation tends to get. This phenomenon is due in part to the fact that when the magnitude of an instantaneous sample is smaller it can produce more drastic phase changes within a given sample interval than when the sample amplitude is larger. An extreme example would be when the signal crosses the origin on I-Q plan within one sample period thus producing 180 degrees of phase shift. On the other hand, when the signal is near its maximum amplitude the incremental angle changes it can produce between samples is the smallest since it is furthest away from the origin.

The synchronization technique described here utilizes this fact that when the amplitude is large its phase rotation tends to be limited, and consequently, it makes it easier to observe the excess phase rotation caused by the mismatch between the transmitted frequency and the demodulation frequency in receiver.

Figure 1:
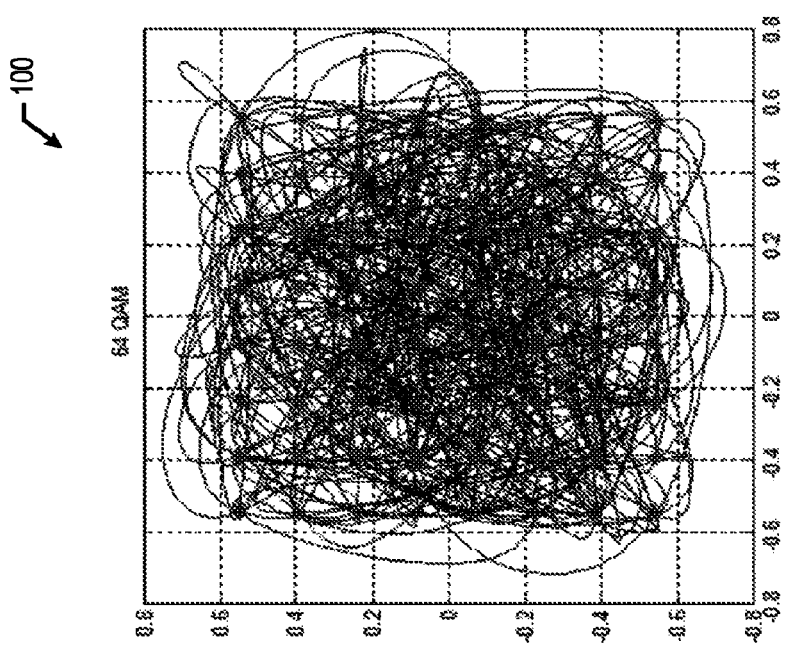
FIG. 1 is a plot of a complex IQ baseband signal in accordance with some embodiments.

In order to illustrate this phenomenon several simulation results are shown. With respect to FIG. 1, a plot of 64-QAM baseband signals with randomly generated I and Q data is shown. The plot tracks the signal phase and magnitude of the baseband signal phase after downconversion from the carrier frequency. With respect to FIG. 2, the cumulative phase rotation over time 202 is shown, and as can be seen, the overall cumulative rotation, when all samples are accounted for, doesn't seem to converge to zero over time. Instead, it tends to wander away as time passes. However, when only higher magnitude signals are considered (80% in this example), the cumulative phase stays quite close to zero rotation in the absence of a frequency offset error. Thus, when only samples above certain threshold (80% or higher in this example) are considered, the wandering effect seems to get reduced drastically as shown in plot 204 in FIG. 2. For a fair comparison a longer period is taken for the 80% simulation in order to capture the same number of samples used to calculate cumulative angular rotation. The simulation shows a drastically reduced cumulative phase when we consider only larger amplitudes despite the fact that both cases come from the same number of samples. Simulation result above with 80% threshold shows no more than $\pi/2$ radian of cumulative angular rotation over 10 million total samples. Other thresholds may be used in various embodiments.

Figure 3:
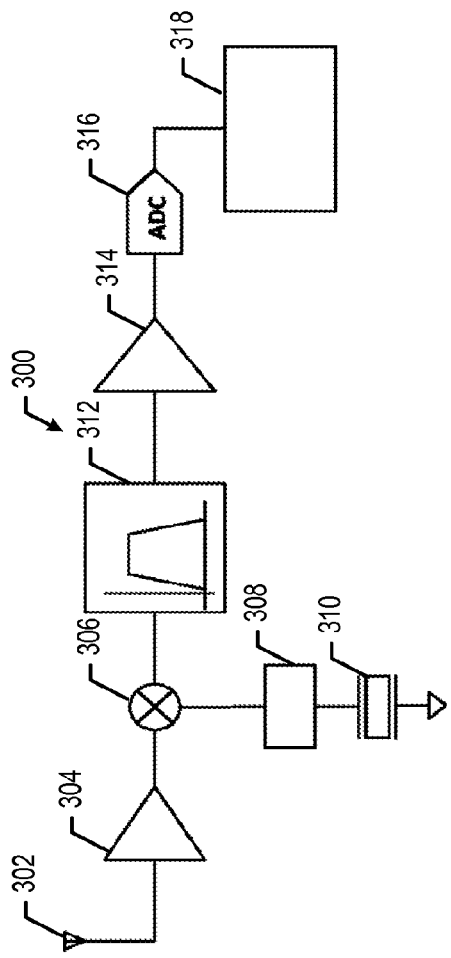
FIG. 3 is a schematic of a frequency locking system in accordance with some embodiments.

FIG. 3 shows one example of how the overall system can be implemented that achieves carrier synchronization using the method described above. The simplified block diagram of a sample open-loop system is shown in FIG. 3. In this embodiment, after each iteration, the offset value will be updated based on the averaged $\delta\phi(i)$. The speed by which this offset value is updated numerically, effectively decides how quickly it converges to the final value. In various embodiments, the update speed may be altered in software as the iteration progresses. For example, in the beginning the system may update faster and gradually slow down the update rate as the iteration progresses and offset value converges toward the final value. This variable update speed shortens overall convergence time. One update method can be a form of accumulator with higher order transfer function, which is equivalent to having a higher order loop filter in a closed loop system.

Figure 4:
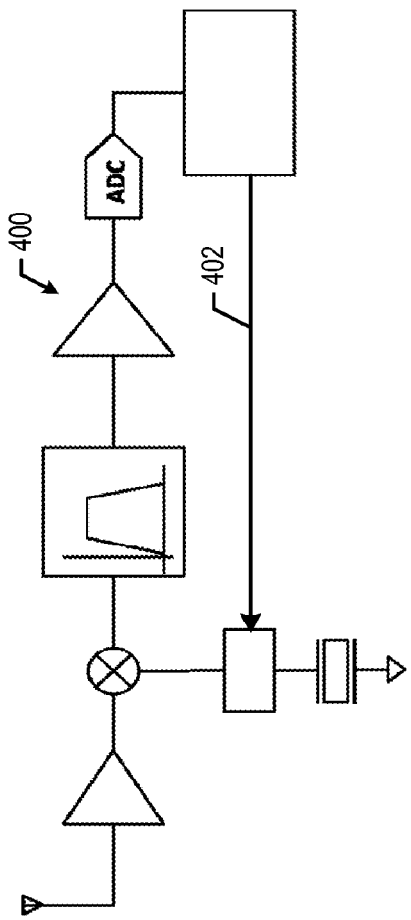
FIG. 4 is a schematic of a frequency locking system in accordance with some embodiments.

A closed loop system is depicted in FIG. 4. The closed loop system adjusts VCXO as shown by signal path 402 in order to synchronize with received RF Carrier using the method described herein. The threshold factor, $\alpha$, may be used to determine how much of the larger amplitude signals will be considered. In simulations shown here, threshold $\alpha=0.8$ is used, which means only the samples with 80% of peak or larger are considered for phase comparison.

Figure 5:
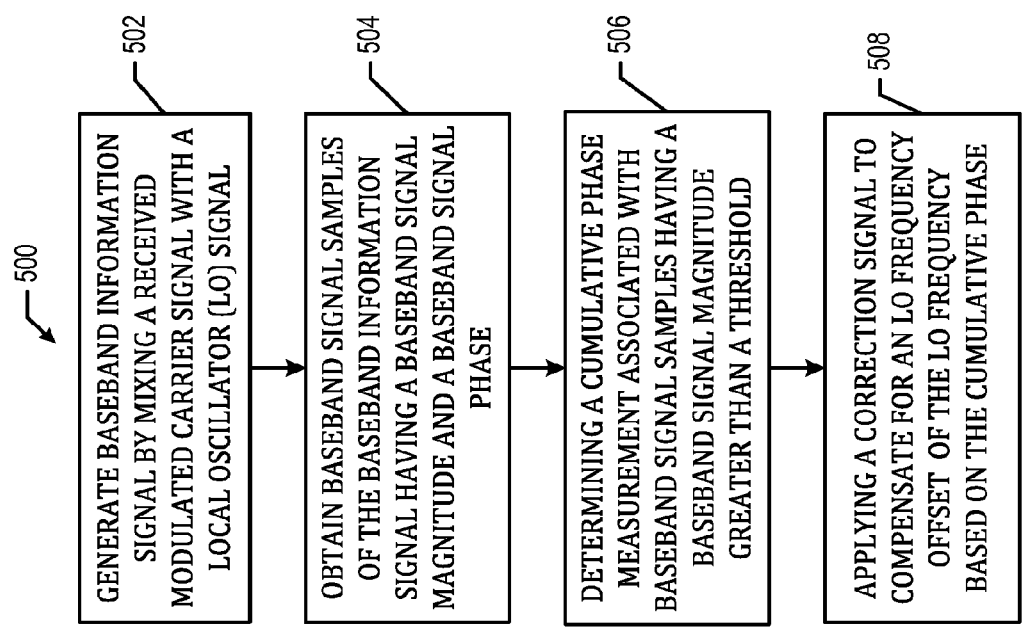
FIG. 5 is a flowchart of a frequency locking algorithm in accordance with some embodiments.

With respect to FIG. 5, a method 500 according to one embodiment is described herein. The method comprises: generating a baseband information signal at 502 by mixing a received modulated carrier signal with a local oscillator (LO) signal having an LO frequency; obtaining baseband signal samples of the baseband information signal at 504 having a baseband signal magnitude and a baseband signal phase; determining a cumulative phase measurement associated with baseband signal samples at 506 having a baseband signal magnitude greater than a threshold; and, applying a correction signal at 508 to compensate for an LO frequency offset of the LO frequency based on the cumulative phase.

The LO signal generally includes an in-phase carrier signal and a quadrature carrier signal, and the baseband signal samples are determined from an in-phase channel sample and a quadrature channel sample. Such LO structures are well-known, and may include a crystal oscillator and a signal splitter, wherein one of the signal branches includes a 90 degree phase offset to generate the quadrature carrier component. Determining the cumulative phase measurement may comprise accumulating a plurality of differential phases, wherein each of the plurality of differential phases is a phase difference between an initial signal point and end signal point, each of the initial signal point and end signal point having magnitudes greater than a threshold α. In an alternative embodiment, the phase differentials between successive IQ points may each be calculated for IQ points where the magnitudes are above the threshold. In some embodiments, the cumulative phase measurement is determined over either (i) a predetermined time interval or (ii) a predetermined number of samples. The time interval or the number of samples may be used to determine an average phase offset/interval or phase offset/time.

The method of applying a correction signal comprises in one embodiment adjusting an LO control signal. The LO control signal may be a tuning voltage based on a low-pass filtered version of the cumulative phase. In an alternative embodiment, the method of applying a correction signal comprises applying a complex rotation to the baseband signal samples. The method of some embodiments may further comprise re-determining the cumulative phase measurement after applying the correction signal. Further embodiments may include iteratively determining the cumulative phase measurement and responsively adjusting the correction signal. The correction signal may also be updated by adjusting a loop filter characteristic, such that an initial large offset may be quickly adjusted for with a large update coefficient, and over time the update coefficient may be reduced to provide a lower loop bandwidth and convergence with less overshoot.

In further embodiments, an apparatus such as shown in FIG. 3 may comprise: a demodulator having a mixer 306 and a local oscillator (LO) 308 configured to generate a baseband information signal by mixing a received modulated carrier signal with an LO signal having an LO frequency; an analog to digital converter 316 configured to generate baseband signal samples of the baseband information signal; a phase accumulator 318 configured to receive the baseband signal samples and to determine a cumulative phase measurement associated with baseband signal samples having a baseband signal magnitude greater than a threshold; and, an LO correction module 318 configured to apply a correction signal to compensate for an LO frequency offset of the LO frequency based on the cumulative phase. The LO 308 includes an in-phase carrier signal generator and a quadrature carrier signal generator. The phase accumulator 318 comprises a magnitude and phase converter configured to generate magnitude and phase information based on an in-phase baseband signal sample and a quadrature baseband signal sample, a differential phase module configured to determine differential phase values, and a magnitude threshold comparator configured to identify differential phase values corresponding to magnitudes greater than a threshold. The LO correction module may comprise an LO control module configured to generate a control signal 402. The LO correction module may comprise a low-pass filter configured to generate the control signal 402 in the form of a tuning voltage based on filtered version of the cumulative phase. The LO correction module may be configured to adjust a loop filter characteristic.

In alternative embodiments, the LO correction module comprises a complex rotation module configured to rotate the baseband signal samples. This type of correction may be performed in open loop such that corrections are not fed back to the LO itself, but the frequency rotation error induced by the LO error is corrected by the complex multiplication by a complex sinusoid.

The phase accumulator in some embodiments is further configured to re-determine the cumulative phase measurement after the LO correction module has applied the correction signal. The apparatus may be configured to iteratively determining the cumulative phase measurement and responsively adjusting the correction signal.

Figure 6:
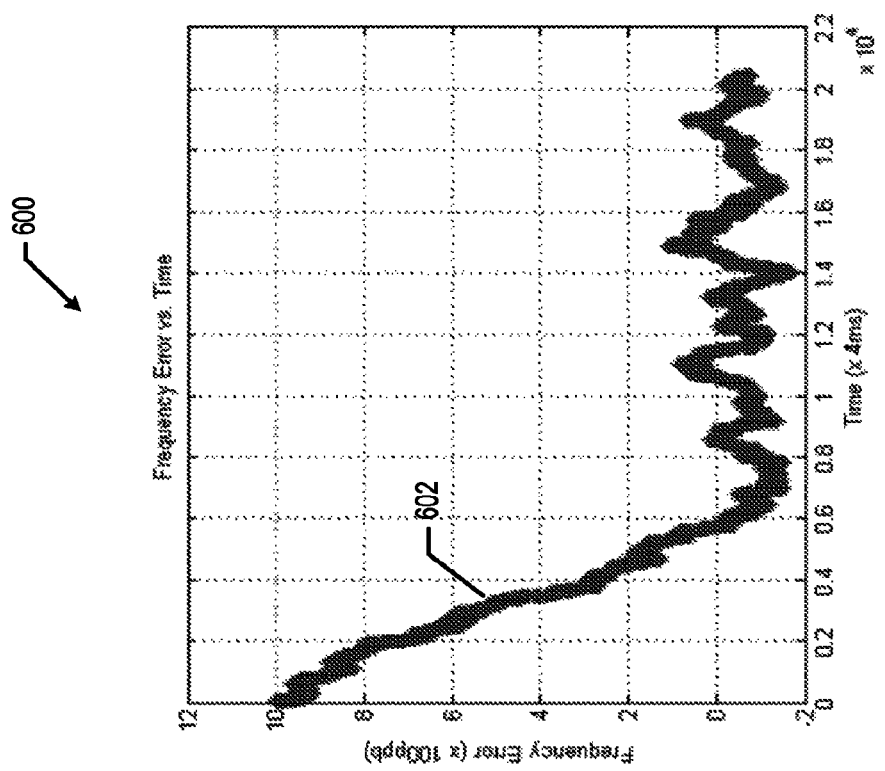
FIG. 6 is a plot of a frequency error based on the algorithm of a frequency lock algorithm in accordance with some embodiments.

Thus, the instantaneous phase increment, $\delta\phi(i)$, between two adjacent samples in the baseband may be averaged over N number of samples, and the average is fed back to the loop filter, which generates tuning voltage for VCXO. This creates a feedback system where the number of the averaged samples (N) and loop filter characteristics affects the overall feedback loop transfer function, which in turn determines the adaptation speed of the VCXO. Simulation shows the slower the adaptation speed (i.e. smaller loop gain) the more accurately the VCXO converges to the correct value. But it comes at the expense of longer settling time. Simulations also show that larger values of threshold α provide better system convergence. However, this comes at the cost of having to take much longer time for the control loop to settle. FIG. 6 depicts the closed loop simulation results that show convergence behavior of the carrier synchronization loop. It shows that with this method the synchronization error can be reduced to about 100 parts per billion (0.1 ppm).

In a further embodiment, higher precision narrow-range synchronization techniques are provided. The RF synchronization techniques described herein makes use of the fundamentally uncorrelated nature of the two quadrature signals, namely the in-phase (I) and quadrature-phase (Q) signals that are modulated into the carrier waveform. In addition, it utilizes the fact that when the correlation of I and Q signals are monitored within a set of data taken over a window of time interval, small mismatches in the transmitted carrier frequency and demodulating frequency can be observed if the synchronization error is within certain range. Therefore, this method can work well with the wide-range synchronization technique described in previous section, which can be applied first in order to obtain a "coarse" synchronization. This narrow-range synchronization technique can then be applied afterward in order to improve further the synchronization accuracy. In alternative embodiments, the narrow-range techniques may be used independently of the coarse synchronization such as if the tolerances of the transmit and receive frequencies result in smaller frequency offsets.

When the quadrature signal is modulated with the carrier frequency $\omega_c$, the received RF signal can be expressed as follows:

$$y(t) = A(t)\cos(\omega_c t + \phi(t)) \quad (3.1)$$
$$= I(t)\cos(\omega_c t) - Q(t)\sin(\omega_c t) \quad (3.2)$$

where $$A(t) = \sqrt{I^2(t) + Q^2(t)}$$
$$\phi(t) = \arctan\left(\frac{Q(t)}{I(t)}\right)$$

When the receiver has a frequency error of $-\epsilon$, its demodulation frequency, $\omega_0$ can be expressed as:

$$\omega_c = \omega_0 + \epsilon \quad (3.3)$$

And the received RF signal, r(t) can be expressed as follows:

$$r(t) = I(t) \cdot \cos(\omega_c t) - Q(t) \cdot \sin(\omega_c t) \quad (3.4)$$

$$= I(t) \cdot \cos(\omega_o t + \varepsilon t) - Q(t) \cdot \sin(\omega_o t + \varepsilon t)$$

$$= I(t)\{\cos(\omega_o t)\cos(\varepsilon t) - \sin(\omega_o t)\sin(\varepsilon t)\} -$$

$$Q(t)\{\sin(\omega_o t)\cos(\varepsilon t) + \cos(\omega_o t)\sin(\varepsilon t)\}$$

$$= \{I(t)\cos(\varepsilon t) - Q(t)\sin(\varepsilon t)\}\cos(\omega_o t) -$$

$$\{Q(t)\cos(\varepsilon t) + I(t)\sin(\varepsilon t)\}\sin(\omega_o t)$$

$$= I_R(t) \cdot \cos(\omega_c t) - Q_R(t) \cdot \sin(\omega_c t)$$

where $$I_R(t) = I(t)\cos(\varepsilon t) - Q(t)\sin(\varepsilon t) \quad (3.4)$$

$$Q_R(t) = Q(t)\cos(\varepsilon t) + I(t)\sin(\varepsilon t) \quad (3.4)$$

Here, $I_R(t)$ and $Q_R(t)$ represent the demodulated baseband signals containing a frequency synchronization error. The above equations show that due to the synchronization error the demodulated quadrature signal will show some correlation between $I_R(t)$ and $Q_R(t)$ stemming from the frequency error $\varepsilon$. In particular, we are interested in correlation between $\{I_R(t)\}^2$ and $\{Q_R(t)\}^2$ whose cross-covariance is defined as below. First, we define the values A and B as the squares of the in-phase and quadrature signals:

$$A \triangleq \{I_R(t)\}^2 \text{ and } B \triangleq \{Q_R(t)\}^2 \quad (3.7)$$

and their mean values to be $\mu_A$ and $\mu_B$ respectively. Then their cross-covariance can be expressed as follows:

$$C(A, B) = E\{(A - \mu_A)(B - \mu_B)\} \quad (3.8)$$

$$= E\{AB\} - \mu_A E\{B\} - \mu_B E\{A\} + \mu_A \mu_B \quad (3.9)$$

$$= E\{AB\} - \mu^2 \quad (3.10)$$

if we assume:

$$\mu = \mu_A = \mu_B$$

Now if we expand the first term of the cross-covariance in equation (3.10), we get the following:

$$\quad (3.11)$$

$$E\{AB\} = E\{(I_R(t))^2 (Q_R(t))^2\}$$

$$= E\{(I(t)\cos(\varepsilon t) - Q(t)\sin(\varepsilon t))^2 \cdot (Q(t)\cos(\varepsilon t) + I(t)\sin(\varepsilon t))^2\}$$

$$= E\{[(I^2(t) - Q^2(t))\sin(\varepsilon t)\cos(\varepsilon t) - I(t)Q(t)(\sin^2(\varepsilon t) - \cos^2(\varepsilon t))]^2\}$$

Here we can see the expectation of the first term goes to zero. Therefore, we get:

$$E\{AB\} = E\{[I(t)Q(t)(\sin^2(\varepsilon t) - \cos^2(\varepsilon t))]^2\} \quad (3.12)$$

$$= E\{[I(t)Q(t)\cos(2\varepsilon t)]^2\}$$

$$= E\left\{(I_R(t)Q_R(t))^2 \left(\frac{1 + \cos(4\varepsilon t)}{2}\right)\right\}$$

-continued $$= E\{(I_R(t)Q_R(t))^2\} E\left\{\frac{1 + \cos(4\varepsilon t)}{2}\right\}$$

$$= \mu^2 \cdot E\left\{\frac{1 + \cos(4\varepsilon t)}{2}\right\}$$

As expected when there is no synchronization error (i.e., $\varepsilon = 0$), the cross-covariance, referred to herein as one type of correlation value, goes to zero since $E\{AB\} = \mu^2$. However, when $\varepsilon \neq 0$ equation (3.12) tells us that the cross-covariance of $I^2(t)$ and $Q^2(t)$ oscillates due to $\cos(4\varepsilon t)$ term. This mathematical derivation provides the basis for the high-precision synchronization technology described herein.

As a slight variant to above approach, in another embodiment we define A and B in equation (3.7) as the absolute values of the in-phase and quadrature signals:

$$A \triangleq |I_R(t)| \text{ and } B \triangleq |Q_R(t)| \quad (3.13)$$

This will yield effectively the same desired results with the slight change in the cross-covariance or correlation expression as follows:

$$C(A,B) = E\{AB\} - \mu^2 \quad (3.14)$$

$$E\{AB\} = \mu^2 \cdot E\{\cos(2\varepsilon t)\} \quad (3.15)$$

A High-Precision Synchronization Procedure will now be described. Noting that the only non-constant term of the cross covariance expressed in equation (3.10) is the term $E\{(I_R(t))^2 \cdot (Q_R(t))^2\}$ as re-written below:

$$E\{(I_R(t))^2 \cdot (Q_R(t))^2\} = \mu^2 \cdot E\left\{\frac{1 + \cos(4\varepsilon t)}{2}\right\}, \quad (3.16)$$

some embodiments utilize a sufficiently long observation window, $\Delta T$ in order to observe sufficient changes in $\cos(4\varepsilon t)$ term. If $4\varepsilon \Delta T = \pi/2$ and $\varepsilon = 200$ Hz for example, then the following interval is obtained:

$$\Delta T = \frac{\pi}{8\varepsilon} = \frac{\pi}{8(200)} = 1.96 \text{ msec}$$

If the de-modulated baseband signal is sampled at 100 MHz for 1.96 ms of observation window, this translates to 196,350 samples.

Using the alternative definition of A and B as in equation (3.13), the non-constant term is:

$$E\{|I_R(t)| \cdot |Q_R(t)|\} = \mu^2 \cdot E\{|\cos(2\varepsilon t)|\} \quad (3.17)$$

Then, for $2\varepsilon \Delta T = \pi/2$, 392,700 samples may be used. Although the latter case requires twice the sample size, it does not require a squaring operation of the samples as in former case, thus from here on, the latter case is used to illustrate various further embodiments for simplicity. In embodiments where a received RF signal is at 2 GHz and its down conversion at the receiver was done using a LO frequency source with accuracy of 100 parts per billion, this translates to the frequency error, $\varepsilon$ of $+/-200$ Hz. Once the sample is taken it is known that the initial frequency error is within the initial error bound of $+/-200$ Hz. The frequency error (synchronization error) in the sampled data may be corrected by applying the amount of frequency error correction (as extra phase) to the sampled data within the expected error bound with finite increments while observing the cross covariance value.

More specifically, we will observe the following correlation value:

$$S = \frac{1}{N}\sum_{k=1}^{N} \{|I_R(k)| \cdot |Q_R(k)|\} \quad (3.18)$$

Figure 7:
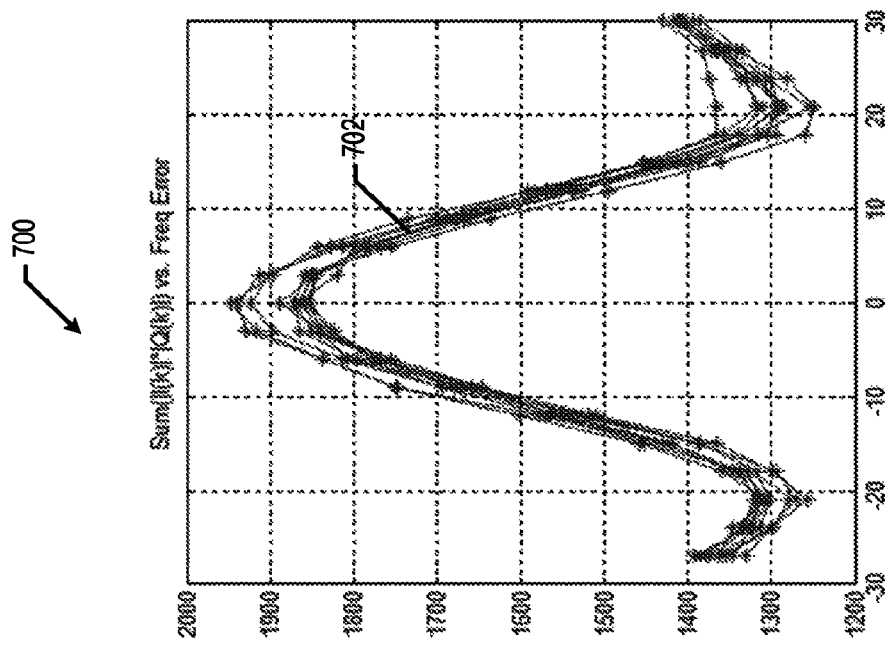
FIG. 7 is a plot of an IQ correlation calculation in accordance with some embodiments.
Figure 8:
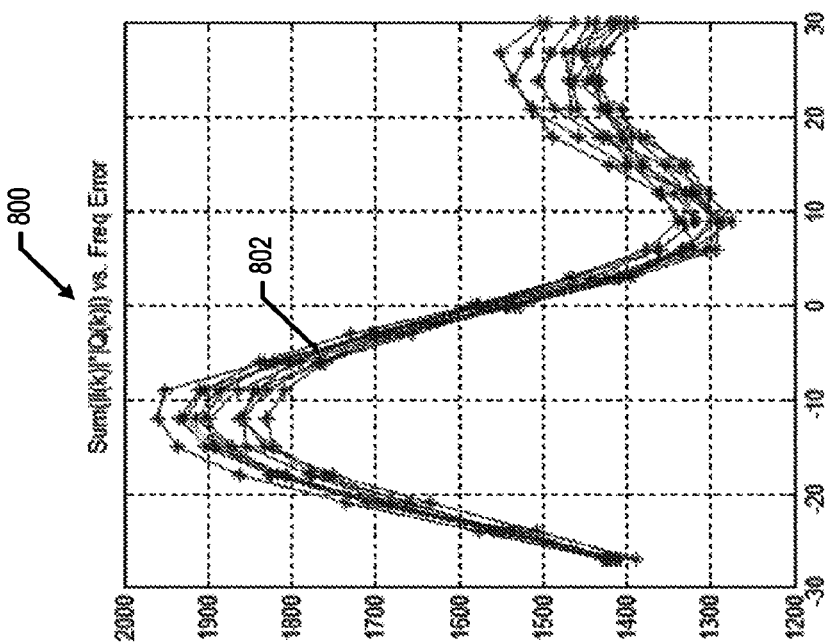

Expressed in an alternative form, a set of values may be determined from:

$$S(i) = \sum_{k=1}^{N} \{|I_{R,i}(k)| \cdot |Q_{R,i}(k)|\}$$

where N represents the total number of samples, and S(i) is calculated by iterating over i various possible frequency error corrections performed on the original observation data. That is, the $I_{R,i}(k)$ and $Q_{R,i}(k)$ are rotated versions of the I and Q samples whose phase has been corrected with an i'th frequency error correction. For instance, if frequency correction amounts have 20 Hz increments from −200 Hz to +200 Hz, there will be 21 sets of S(i) with i ranging from 1 to 21. If the actual frequency error was 122 Hz, then, the correction of −120 Hz will show the best correction resulting in highest S(i) value in the set. Shown in FIGS. 7 and 8 are simulation results using 64-QAM modulated signal with and without frequency error. First, FIG. 7 shows 10 different plots taken with 10 different set of samples with no frequency synchronization error. Each plot has 21 points showing +/−10 incremental frequency adjustments made for the given set of samples. As expected no adjustment case (mid-point) consistently shows the best result for all ten plots—highest value means least correlation between |IR| & |QR|. The multiple plots (10 in total) are shown in the figures in order to illustrate that the results are consistent given any set of data despite the fact that this method fundamentally relies on the statistical nature of the data. This is due to the fact that each plot is effectively an integral (or summation) of the total samples, N as expressed in equation (3.18) resulting in the outcome free of the random nature of the individual samples.

FIG. 8 shows repeated simulation with 10 new sets of samples with a frequency offset synchronization error. Then a total of +/−10 incremental frequency adjustments were made for each set of samples. All ten results consistently indicate that the sixth adjustment from left (−12) accomplishes the best frequency offset and synchronization error correction.

Using this information the system can correct the frequency error by figuring out how much correction is needed from tabulation. With each iteration the algorithm can determine the precise amount of frequency correction required by reducing the increment to a smaller value while increasing the number of samples. As the error gets smaller with each iteration, the required sample size may get larger as the period of cos(2εt) in equation (3.17) gets longer. Simulations show better than one part per billion accuracy of synchronization can be achieved using this method even after accounting for noise level and I-Q mismatches expected in a real system.

If a desired outcome is just to maintain an accurate offset of the existing clock source in the receiver, precise frequency error (or error in reference crystal oscillator) can be extracted through this method and the local receiver's system clock can be updated in digital domain using the procedure described above (i.e., via a complex rotation of the IQ sample data). On the other hand, if the final goal is to fine-tune the Voltage-Controlled Chrystal Oscillator (VCXO) an embodiment may be used that simplifies the necessary sampling and computation described above to a minimum and just extract the minimal information needed from each iteration to figure out which direction the reference frequency needs to be corrected. Then a feedback loop such as a PLL can be employed to settle at the final corrected value. The sweeping range may start initially large to cover the whole possible error range. However, the range and increment can be reduced to a much finer value after a few iterations, which in turn minimizes delay in the feedback and allow wider loop bandwidth for better noise shaping of the reference crystal oscillator (VCXO). Another alternative method is to adjust a fractional division ratio of a phase locked loop (PLL) as a way to correct the frequency error instead of tuning reference crystal oscillator once the precise amount of frequency error has been extracted using the method described above.

Figure 11:
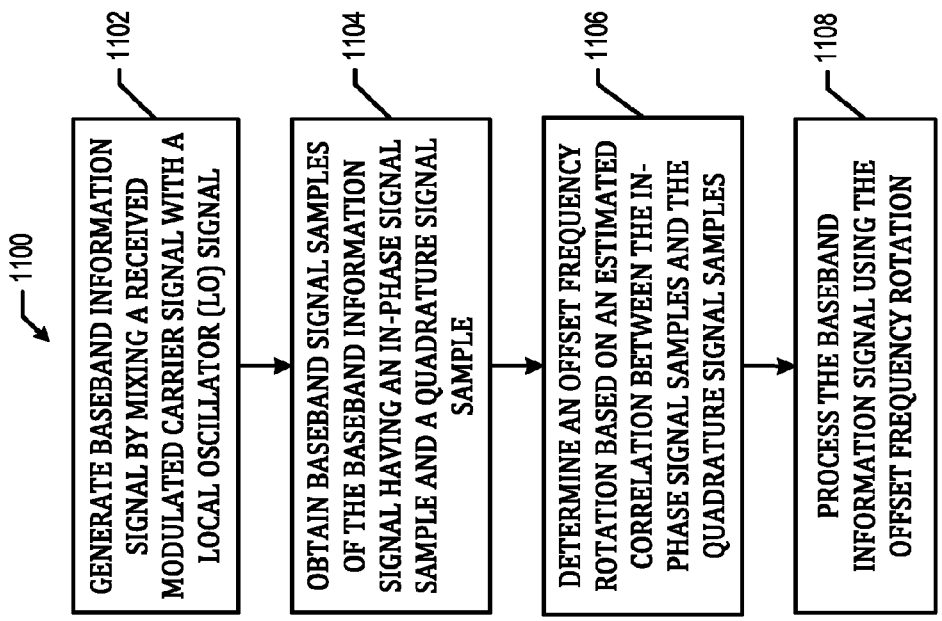
FIGS. 11-12 are flowcharts of frequency locking algorithms in accordance with some embodiments.

Thus, in one embodiment depicted in FIG. 11, a method 1100 comprises: generating a baseband information signal at 1102 by mixing a received modulated carrier signal with a local oscillator (LO) signal having an LO frequency; obtaining baseband signal samples of the baseband information signal having an in-phase signal sample and a quadrature signal sample at 1104; determining an offset frequency rotation based on an estimated correlation between the in-phase signal samples and the quadrature signal samples at 1106; and, processing the baseband information signal using the offset frequency rotation at 1108. In one embodiment, the method of processing the baseband information signal using the offset frequency rotation comprises adjusting the LO frequency using an LO control signal. In a further embodiment, the method of applying a correction signal comprises applying a complex rotation to the baseband signal samples. In some embodiments, the estimated correlation between the in-phase signal samples and the quadrature signal samples is based on squared in-phase samples and squared quadrature samples. In alternative embodiments, the estimated correlation between the in-phase signal samples and the quadrature signal samples is based on absolute values of in-phase samples and absolute values of quadrature samples.

Embodiments described herein may further utilize a phase alignment technique. One implicit assumption made in the previous section is that at the beginning of the observation window (t=0) there is perfect phase alignment. However, in reality the demodulated complex signal (I+j*Q) contains a phase offset as well as the frequency offset stemming from the synchronization error, ε. However, it turns out that the correlation behavior of the sampled data set described in section 3.3 also provide information about the phase offset of the data. When there is zero phase offset at time t=0, the tabulated data set, S in equation (3.18) exhibits symmetry about the i'th set that represents the least correlation. This is because the correlation expressions shown in (3.16) and (3.17) are even functions. However, if there is a phase offset at t=0, this symmetry is lost as illustrated in FIG. 9 with simulation results.

Figure 9:
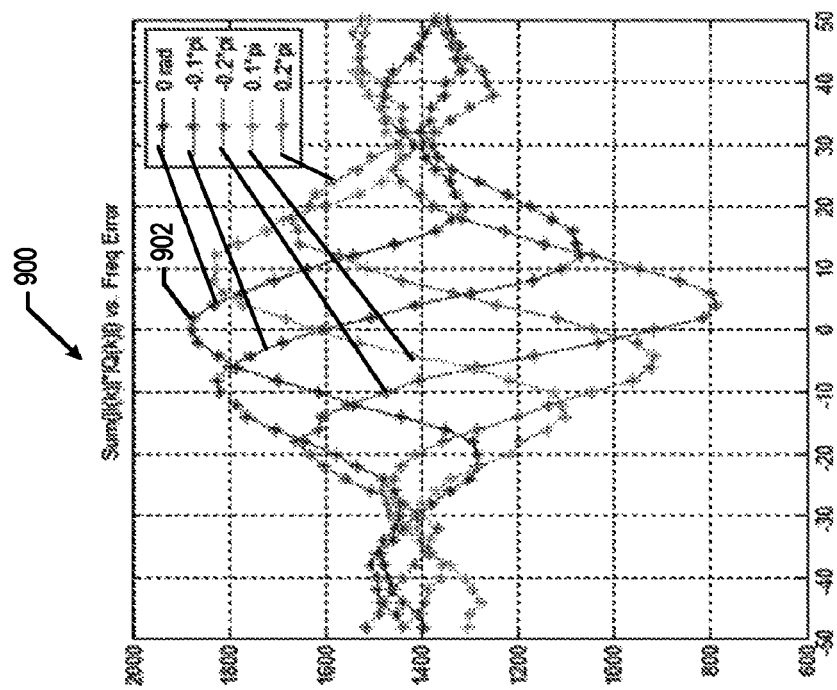
FIGS. 8-10 are plots of an IQ correlation calculation in accordance with some embodiments.

FIG. 9 depicts plots of estimated correlations with phase offsets using data samples without a frequency offset synchronization error. As expected without phase offset (902) the maximum value occurs when no frequency correction is made (mid-point) and the overall plot maintains symmetry about y-axis. However, with the remaining curves that are generated from sample data having phase offsets (but no frequency offsets), the peak value occurs at a wrong frequency offset correction value and the overall plot does not show even-function symmetry.

Some embodiments may utilize this symmetry property and can accomplish both phase alignment and frequency synchronization at the same time. Thus, in one embodiment, after obtaining the tabulation of frequency error correction on the sampled data set, the algorithm may adjust a phase offset of the data set until the symmetry is established. This is a fairly straight forward procedure that may sweep phase values between 0 and $\pi/2$ until the data set exhibits symmetry. This symmetry repeats every $\pi/2$ since I and Q are offset by $\pi/2$. In order to accomplish correct frequency synchronization, the algorithm may perform phase alignment using this procedure first. As the frequency error, $\epsilon$, gets smaller after each iteration, the required phase alignment gets smaller as well.

Figure 10:
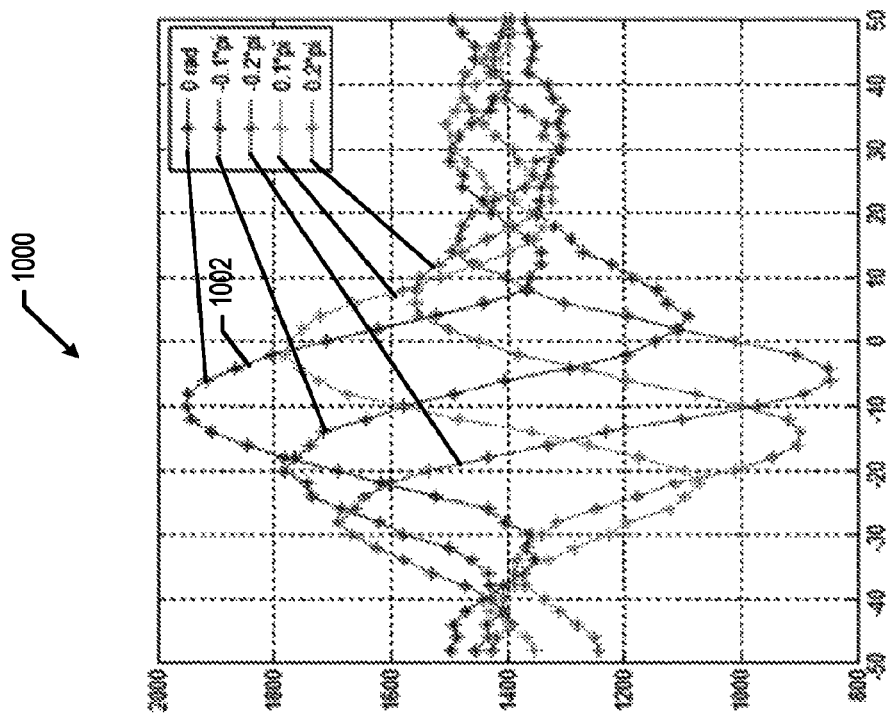

As shown in FIG. 10, correlation estimates are plotted with the various indicated phase offset corrections for an IQ complex sample data set that contains a −10 frequency offset error and no phase offset. As expected, the curve without the phase offset shows the correct frequency offset correction.

Phase alignment in a communication channel typically may be done at an upper layer after frequency synchronization has been accomplished. Therefore, accomplishing phase alignment while performing frequency synchronization is an attractive feature, especially where the system deploys multiple receivers as in MIMO radios, or Active Array Antennas.

It is also worth noting here that if $\epsilon$ is too great to start with, the appropriate sample size (time window) required to observe the integrated cosine curve becomes too small. Then a single capture of the data set is statistically too unreliable in order to observe the integrated cosine pattern, which prevents proper phase correction. For this reason this high precision synchronization methods described above are mainly suitable once a reasonable synchronization is achieved first. Consequently, this method combined with the wide-range synchronization method described above would work well if the expected frequency error is rather high to begin with.

Figure 12:
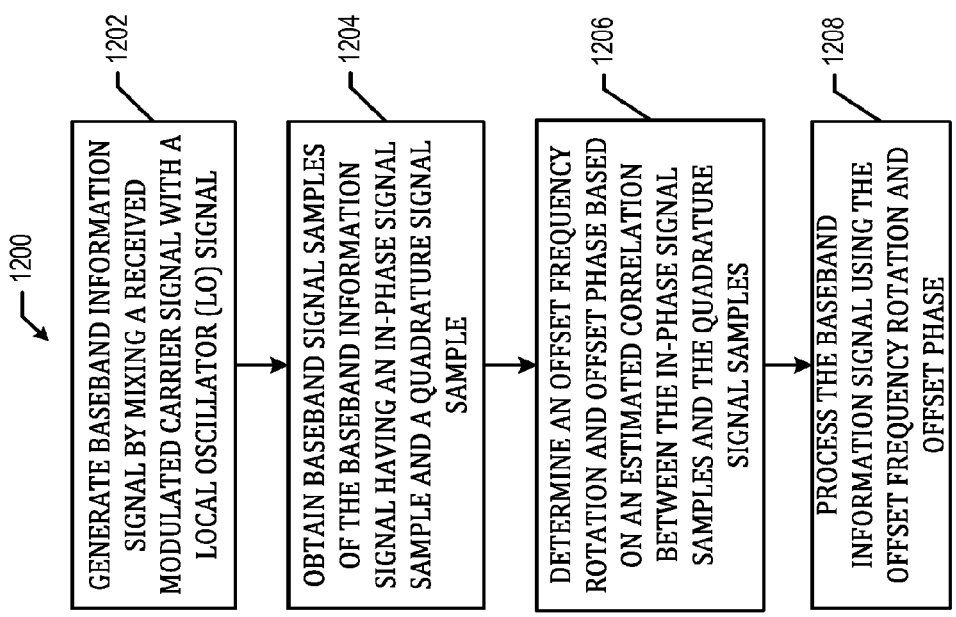

FIG. 12 depicts one embodiment of a synchronization and phase alignment process. However, it is just one example and there can be many variants that utilize the correlation behavior between I and Q in the presence of synchronization error as described in this document. The example flow chart describing the carrier synchronization and phase alignment procedure may be repeated continuously or periodically at a slow interval since tracking the frequency errors in reference crystal oscillators doesn't need to be fast. In a further embodiment, a method 1200 comprises: generating a baseband information signal by mixing a received modulated carrier signal with a local oscillator (LO) signal having an LO frequency at 1202; obtaining baseband signal samples of the baseband information signal having an in-phase signal sample and a quadrature signal sample at 1204; determining a phase offset and an offset frequency rotation based on an estimated correlation between the in-phase signal samples and the quadrature signal samples at 1206; and, processing the baseband information signal using the offset frequency rotation and offset phase at 1208. In one embodiment, the offset phase is determined based on a symmetry property of the estimated correlation, the symmetry property being measured with respect to a plurality of frequency offsets. In further embodiments, the offset frequency rotation and the offset phase is determined with respect to a maximum value of the estimated correlation, wherein the estimated correlation is calculated using a plurality of candidate phase offsets over a first range and candidate frequency rotations over a second range. In further embodiments, the method may include updating the offset frequency rotation and the offset phase by recalculating a maximum value of the estimated correlation, wherein at lease one of the first range and the second range is reduced. Further, the estimated correlation between the in-phase signal samples and the quadrature signal samples is based on squared in-phase samples and squared quadrature samples or on absolute values of in-phase and quadrature signals.

The frequency synchronization embodiments described herein may be combined with positioning systems and methods. With respect to FIG. 13, the calculations for the Range (Distance) between two nodes (Cell A and Cell B), once the two nodes are frequency synchronized, will be described. $T_1$: time information at cell A is sent to cell B ($T_{1A}$); $T_2$: $T_{1A}$ received time at B ($T_{2B}$); $T_3$: time information sent from cell B to cell A ($T_{2B}$, $T_{3B}$); $T_4$: $T_{2B}$, $T_{3B}$ received time at cell A ($T_{4A}$); $T_{1A}$ and $T_{4A}$ are local time at cell A, $T_{2B}$ and $T_{3B}$ are local time at cell B; $D_R$ is the actual time delay due to the distance (range delay); $D_B$ is the processing time delay at cell B; $\widetilde{D_R}$ is the range delay estimate calculated at cell A, and $\epsilon_{fA}$, $\epsilon_{fB}$ are the reference frequency errors at cell A and cell B.

Figure 13:
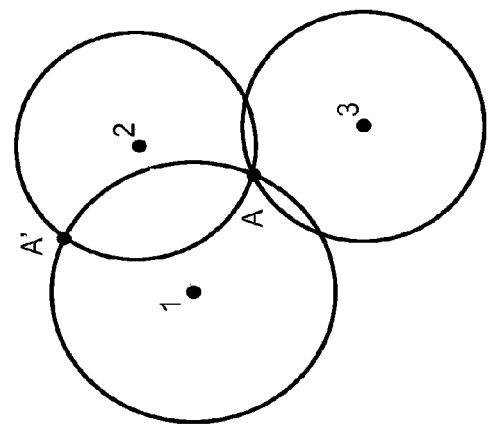
FIG. 13 is a timing diagram of a time synchronization algorithm in accordance with some embodiments.

Here $T_1$, $T_2$, $T_3$, $T_4$ denote ideal time. The above example described with respect to FIG. 13 illustrates how Cell A may figure out the distance between Cell A and Cell B from a single exchange of time information. First, Cell A sends its local time information ($T_{1A}$) at time $T_1$. Then, Cell B records the arrival time ($T_2$) according to its local time, which is denoted as $T_{2B}$. Cell B then transmits back to Cell A this arrival time at time $T_3$ along with the transmit time ($T_{3B}$). These two values ($T_{2B}$ and $T_{3B}$) are all that Cell A needs in order to figure out what the actual time delay is due to the actual distance between the two Cells because it has a synchronized reference frequency. The derivation of the delay expression is shown below.

$$\widetilde{D_R} = 0.5 \cdot \{(T_{4A} - T_{1A}) - (T_{3B} - T_{2B})\} \quad (3.23)$$
$$= 0.5 \cdot \{(T_4 - T_1)(1 + \varepsilon_{fA}) - (T_3 - T_2)(1 + \varepsilon_{fB})\}$$
$$= D_R(1 + \varepsilon_{fA}) + 0.5 \cdot D_B(\varepsilon_{fA} - \varepsilon_{fB})$$
$$\cong D_R + 0.5 \cdot D_B(\varepsilon_{fA} - \varepsilon_{fB})$$

Here, $\epsilon_{fA}$ and $\epsilon_{fB}$ represent reference frequency error at nodes cell A and cell B respectively expressed in fraction, e.g., if cell A has 1 ppm of frequency error, $\epsilon_{fA}$ would be 1e-6. The $D_R$ value is calculated, which represents the time delay of a radio wave travelling at the speed of light from Cell A to Cell B. This value will be in general quite small; for example, 300 meter distance will cause 1 us time delay. On the other hand, $D_B$ represents the processing delay at Cell B which can easily be several miliseconds. Therefore, as can be seen in equation (3.23), when the two nodes are not synchronized in frequency, the resulting calculation can easily be dominated by this process delay time, $D_B$, which makes this method ineffective. However, once the two nodes are frequency-synchronized, the second term in (3.23) drops out and the calculation accurately shows the actual time delay between the two nodes.

As can be seen in this calculation the delay estimate error is a function of the relative frequency error (synchronization error) and the absolute frequency error has negligible impact on the accuracy of the range delay calculation as long as the frequency error at both cells are the same—in other words, as long as $\epsilon_{fA}=\epsilon_{fB}$. It also shows that the absolute time error cancels out in the delay expression, and it has a negligible impact on the accuracy of the range delay, $D_R$ measurement.

Thus in still further embodiments, the synchronization techniques may be used in conjunction with a time synchronization protocol as described with respect to FIG. 13.

Further embodiments include the use of the above-described frequency synchronization techniques for network time synchronization. Once network nodes are able to achieve a high-degree of frequency synchronization using the methods and devices described above, network time synchronization may be achieved by various nodes in the network. Since all nodes are synchronized in their reference frequency and their relative distances can also be determined according to the method described above, each node may engage in an exchange of time information from a reference node (a master node), which provides the master clock for the network. Since the time delay from the master node can precisely be measured using the positioning method described above (or in many applications, it might be already known by other means), each node can calculate the precise time synchronized to the master clock from a single exchange of time information. Frequency and time synchronization steps could repeat at a set interval to maintain a high degree of synchronization against temporal perturbations in the network.

Positioning systems employing the frequency synchronization technique may include mobile-to-mobile positioning systems, mesh network systems, and network systems.

Figure 14:
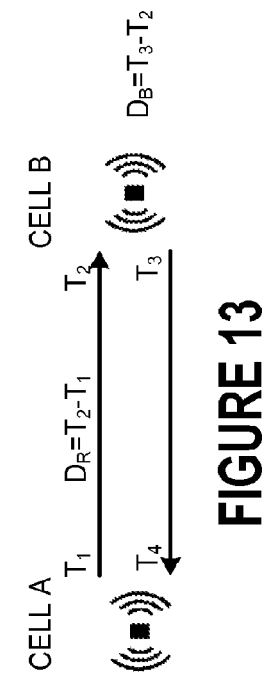
FIG. 14 is a diagram of a positioning algorithm in accordance with some embodiments.

In a mobile-to-mobile positioning systems, the frequency synchronization and positioning algorithms and methodology described above may be employed in a group of radios that are designed to communicate to one another. Given any two radios in communication, the methods described above allow both parties to calculate the distance between the two. This is illustrated in FIG. 14.

In addition, because the frequency synchronization algorithm also extracts the phase offset of the arrived signal as a bi-product, the use of a multi-input receiver also allows the system to calculate the arrival angle of the incoming radio wave simply by comparing this phase offset adjustment at the two inputs of the receiver. Having the angle of arrival along with the distance information allows one radio unit to locate the target location in two-dimensional space such as flat surface areas. If the Receiver is equipped with three receivers, the target can be located in three-dimensional space.

Figure 15:
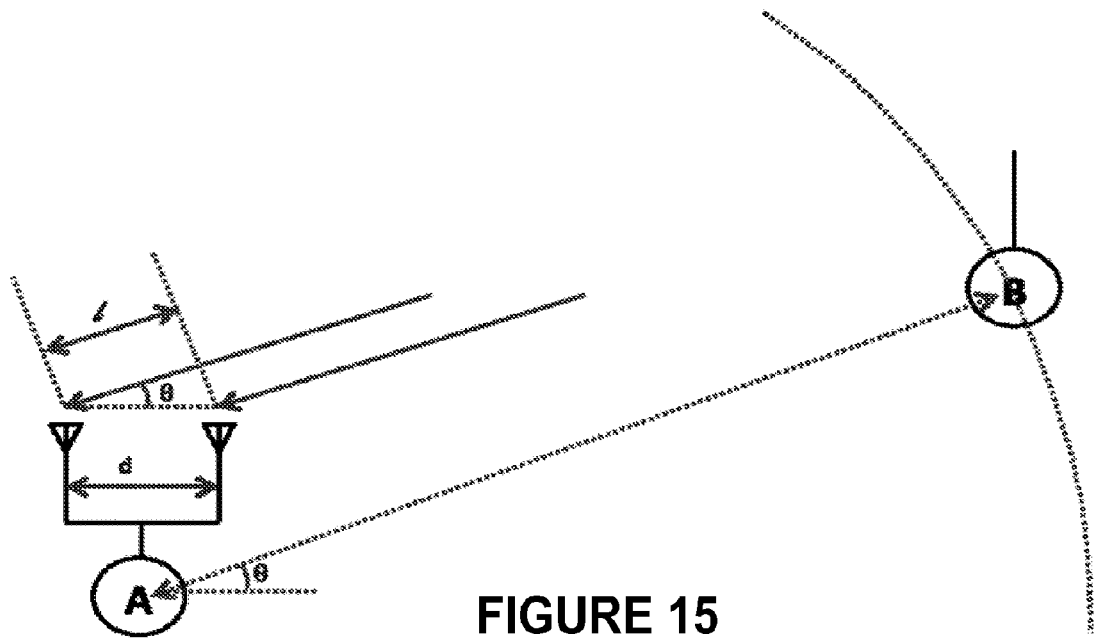
FIG. 15 is a diagram of a angle of arrival positioning algorithm in accordance with some embodiments.

The mobile-to-mobile positioning system is illustrated in FIG. 15, where:

$$\cos\theta = \frac{l}{d} \text{ and } \frac{l}{\lambda} = \frac{\delta\phi}{2\pi}$$

And therefore, $$\theta = \cos^{-1}\left(\frac{c\delta\phi}{2\pi df}\right)$$

where $\delta\phi$ is the phase offset difference between two received signals at node A, and $\lambda$ and f are the wavelength and frequency, and c is the speed of light.

Figure 16:
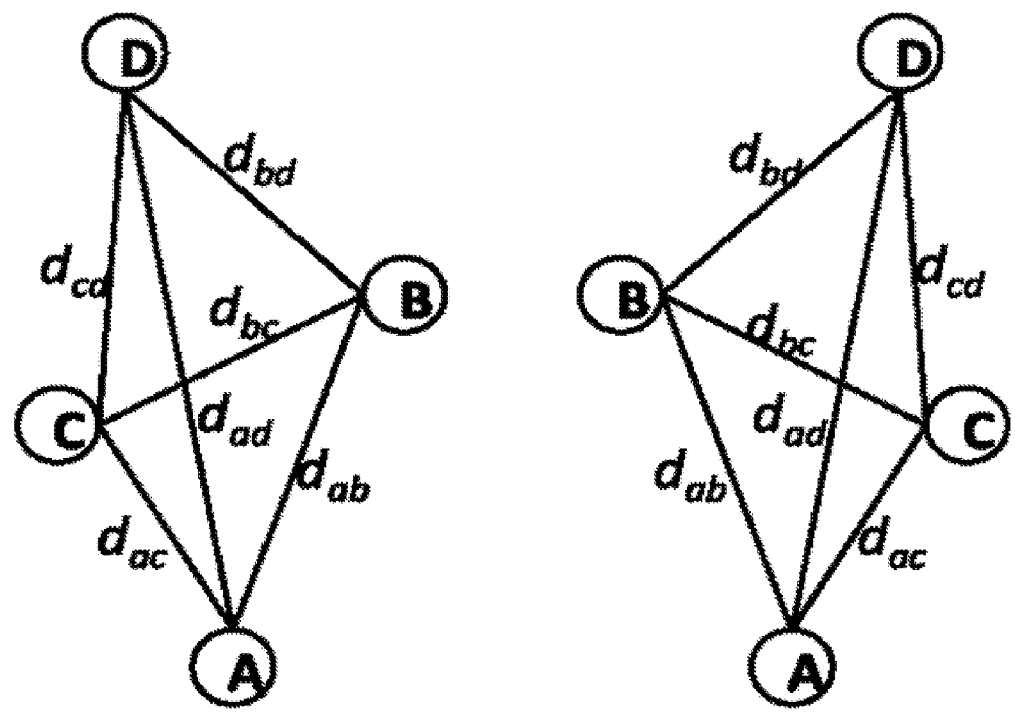
FIG. 16 is a diagram of a positioning algorithm in accordance with some embodiments.

In a mesh network positioning system, a mesh network with multiple individual mobile radios can collectively use the frequency synchronization and positioning algorithms described above in order to figure out relative positions of each of the mesh nodes. Described below is the case with four mobile units where each unit can figure out the distance to the other three units using the method described above. By sharing the distance information from one another the nodes can figure out that the relative location of all four with respect to one another can only have two possible solutions as illustrated in the diagram FIG. 16. Therefore, only with one extra piece of information addressing the acceptable orientation of the two solutions, the nodes can determine exactly where each node is with respect to one another using the positioning method described above. Furthermore, figuring out initial orientation only requires three units to initialize their relative location and orientation. This can easily be accomplished as initialization process for the mesh network prior to deploying the network.

In a network-based positioning system, frequency and time synchronization of all the network nodes is achieved using the methods described above. Once this is accomplished, the network can determine where the individual mobile units are located. Two methods of locating individual users (User Equipments: UE) in a network are described below.

Figure 17:
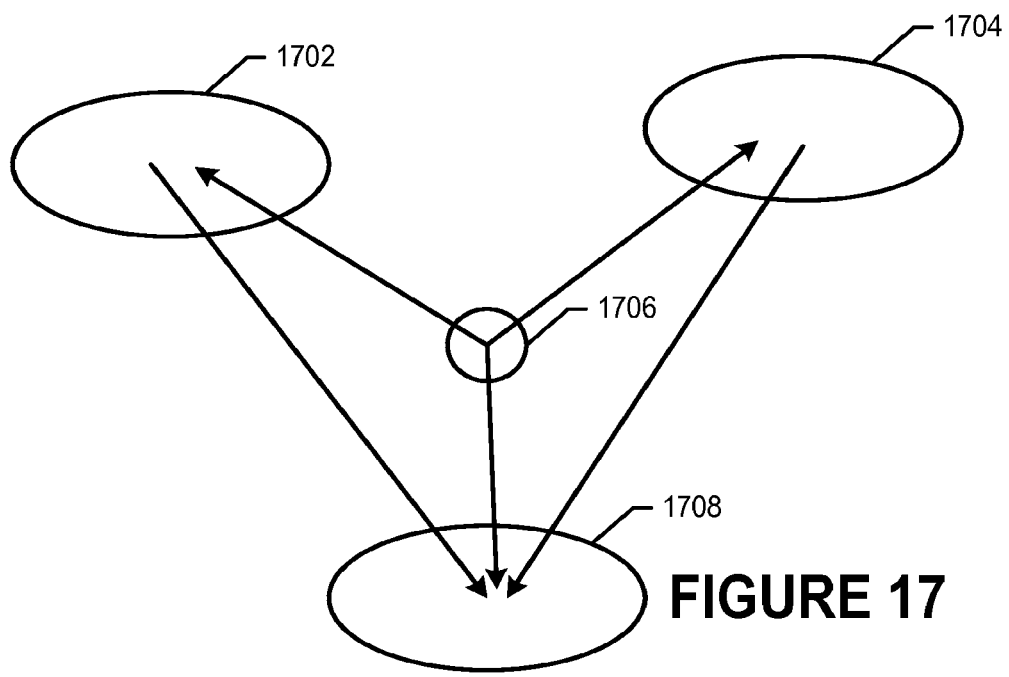
FIGS. 17 and 18 are message flow diagrams of positioning algorithms in accordance with some embodiments.

In a network-based positioning system, uplink signals, as shown in FIG. 17, may be used. Because the network nodes are already "perfectly" synchronized, the network may compare the arrival times of the mobile unit signal from mobile unit 1708 from several network nodes 1702, 1704, and 1708 (e.g., base stations). In the embodiment of FIG. 17, the arrival times at network nodes 1702 and 1704 are conveyed to node 1708 for comparison. The difference in arrival time indicates the difference in distance between the mobile unit and the network nodes. Ideally only three measurements involving three network nodes may be used to locate the mobile unit in a three dimensional space. In this method, positioning of mobile unit does not require the mobile unit radio (UE) to be synchronized with network nodes. This method also requires no calculation to be performed in mobile unit.

Figure 18:
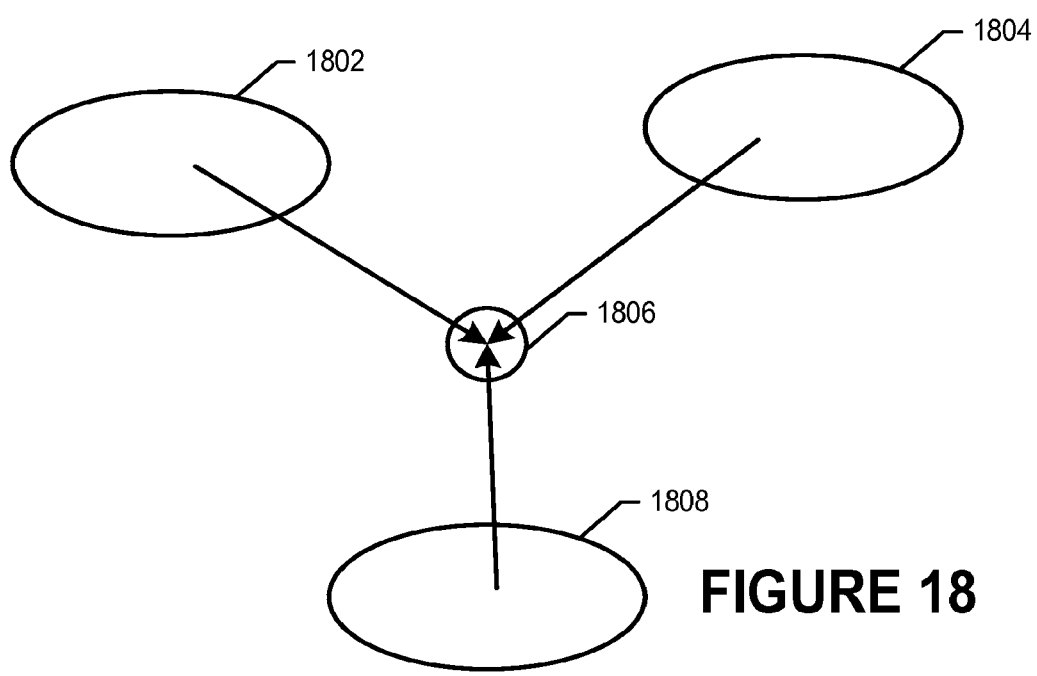

In network-based positioning systems, downlink signals may be used as shown in FIG. 18. In this embodiment of the network-based positioning system utilizing the frequency synchronization and positioning algorithms described herein, network nodes 1802, 1804, and 1808 broadcast timing and positioning information. Individual mobile units such as unit 1806 may receive these signals from the multiple network nodes (base stations) and calculate its own position using a trilateration method.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter

I claim:

1. A method for synchronization and positioning, comprising:
    receiving, at a first antenna at a receiver, a known signal generated at a transmitter;
    receiving the known signal at a second antenna at the receiver, wherein the known signal received at the second antenna is shifted in phase from the known signal received at the first antenna as a result of a path delay difference;
    plotting a first arbitrary set of phase corrections and finding a first phase offset corresponding to a first set with even function symmetry within the first arbitrary set of phase corrections, thereby determining the first phase offset for the known signal received at the first antenna;
    plotting a second arbitrary set of phase corrections and finding a second phase offset corresponding to a second set with even function symmetry within the second arbitrary set of phase corrections, thereby determining the second phase offset for the known signal received at the second antenna;
    calculating an angle of arrival for the known signal from the transmitter based on the first and the second phase offset for the known signal as received at the first antenna and the second antenna; and
    calculating a positioning vector for a direction of the transmitter.

2. The method of claim 1, further comprising performing a synchronization of the transmitter and the receiver.

3. The method of claim 2, further comprising calculating a synchronization offset by determining a cumulative phase measurement associated with baseband signal samples having a baseband signal magnitude greater than a threshold.

4. The method of claim 3, further comprising calculating the synchronization offset by determining an offset frequency rotation based on an estimated correlation between the in-phase signal samples and the quadrature signal samples.

5. The method of claim 1, further comprising performing a round-trip time measurement, calculating a distance between the transmitter and the receiver using the round-trip time, and calculating a position of the transmitter in two-dimensional space using the positioning vector.

6. The method of claim 1, further comprising receiving the known signal at a third antenna, calculating a third phase offset for the known signal received at the third antenna, and calculating a three-dimensional positioning vector for the direction of the transmitter.

7. The method of claim 6, further comprising performing a round-trip time measurement, calculating a distance between the transmitter and the receiver using the round-trip time, and calculating a position of the transmitter in three-dimensional space using the three-dimensional positioning vector.

8. The method of claim 1, further comprising receiving the known signal at multiple additional antennas, and obtaining additional angle of arrival measurements, thereby obtaining additional accuracy.

9. The method of claim 1, further comprising synchronizing clocks at the transmitter and the receiver, and synchronizing one or more backhaul channels using the synchronized clocks at the transmitter and the receiver to provide increased throughput on the one or more backhaul channels.

10. The method of claim 1, further comprising repeating the method using a finer granularity to increase the accuracy of the angle of arrival calculation.

11. A system for locating a transmitter, comprising:
a processor configured to process baseband signal samples;
a first antenna coupled to the processor and configured to provide baseband signal samples to the processor;
a second antenna coupled to the processor and configured to provide baseband signal samples to the processor; and
a memory containing instructions that, when executed, cause the processor to perform steps including:
receiving, at the first antenna, a known signal generated at a transmitter;
receiving the known signal at the second antenna, wherein the known signal received at the second antenna is shifted in phase from the known signal received at the first antenna as a result of path delay;
plotting a first arbitrary set of phase corrections and finding a first phase offset corresponding to a first set with even function symmetry within the first arbitrary set of phase corrections, thereby determining the first phase offset for the known signal received at the first antenna;
plotting a second arbitrary set of phase corrections and finding a second phase offset corresponding to a second set with even function symmetry within the second arbitrary set of phase corrections, thereby determining the second phase offset for the known signal received at the second antenna;
calculating an angle of arrival for the known signal from the transmitter based on the first and the second phase offset for the known signal as received at the first antenna and the second antenna; and
calculating a positioning vector for a direction of the transmitter.

12. The system of claim 11, wherein the system is a cellular base station.

13. The system of claim 11, wherein the system is a Wi-Fi base station.

14. The system of claim 11, wherein the system is a multiple-in, multiple-out (MIMO) antenna system.

15. The system of claim 11, further comprising a second system time-synchronized with the system.

16. The system of claim 15, wherein the system and the second system are time-synchronized using one of a cumulative phase measurement, an offset frequency rotation, or a residual correlation.

* * * * *